US012716738B1

(12) United States Patent
Li et al.

(10) Patent No.: US 12,716,738 B1
(45) Date of Patent: Aug. 25, 2026

(54) AUTOMATING ACTION DETECTION AND PROGRESSION USING REAL-TIME CLASSIFICATION MODEL

(71) Applicant: Amazon Technologies, Inc., Seattle, WA (US)

(72) Inventors: Yan Li, Sammamish, WA (US); Polina Berezina, Bellevue, WA (US); Nadeesha Oliver Ranasinghe, Laguna Hills, CA (US); Emre Eftelioglu, Puyallup, WA (US); Gil Yehuda Wolff, Kirkland, WA (US); Amber Roy Chowdhury, Bellevue, WA (US); Pawel Matykiewicz, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 18/735,580

(22) Filed: Jun. 6, 2024

(51) Int. Cl.
*G06Q 10/083* (2024.01)
*G01C 21/36* (2006.01)

(52) U.S. Cl.
CPC ..... *G01C 21/3626* (2013.01); *G01C 21/3667* (2013.01); *G06Q 10/083* (2013.01)

(58) Field of Classification Search
CPC ............ G01C 21/3626; G01C 21/3667; G01C 21/3655; G06Q 10/083; G06Q 10/08365; G06Q 10/087; G06Q 10/0841; G06Q 10/0843; G06Q 30/0633
See application file for complete search history.

(56) References Cited

U.S. PATENT DOCUMENTS

| | | | | |
|---|---|---|---|---|
| 11,941,572 | B1 * | 3/2024 | Ravichandran | H04W 4/38 |
| 2013/0262335 | A1 * | 10/2013 | Murakami | G06Q 10/0833 705/333 |
| 2014/0028477 | A1 * | 1/2014 | Michalske | G08G 1/005 340/990 |
| 2015/0170031 | A1 * | 6/2015 | Attar | G08G 1/005 706/46 |

(Continued)

FOREIGN PATENT DOCUMENTS

KR 102291377 B1 * 8/2021 ............. G08G 1/123

OTHER PUBLICATIONS

KR 102291377 B1—machine translation (Year: 2021).*

*Primary Examiner* — Dino Kujundzic
(74) *Attorney, Agent, or Firm* — Kilpatrick Townsend & Stockton LLP

(57) ABSTRACT

Techniques for automating workflow using a real-time driver activity classification model are described herein. For example, an electronic device can execute a machine learning model based at least in part on an input comprising geolocation data and motion data detected by the electronic device. The machine learning model can generate a classification indicating that a state of the electronic device with respect to motion. The electronic device can detect that the electronic device is within a threshold distance from a service address. The electronic device can detect that the state is a non-driving state. Responsive to (i) detecting that the state is a non-driving state and (ii) detecting that the electronic device is within the threshold distance from the service address, the electronic device can transition from presenting a set of driving instructions to presenting instructions for performing a service at the service address.

20 Claims, 9 Drawing Sheets

(56) References Cited

U.S. PATENT DOCUMENTS

| | | | | |
|---|---|---|---|---|
| 2019/0158994 | A1* | 5/2019 | Gross | H04W 4/025 |
| 2019/0385121 | A1* | 12/2019 | Waliany | G06F 9/54 |
| 2020/0074386 | A1* | 3/2020 | Mossoba | G06F 40/205 |
| 2024/0092377 | A1* | 3/2024 | Chang | B60K 35/60 |

* cited by examiner

EXECUTE, BASED AT LEAST IN PART ON AN INPUT COMPRISING GEOLOCATION DATA AND MOTION DATA DETECTED BY AN ELECTRONIC DEVICE, A MACHINE LEARNING MODEL TO GENERATE A CLASSIFICATION INDICATING A STATE OF THE ELECTRONIC DEVICE WITH RESPECT TO MOTION 602

DETECT, BASED AT LEAST IN PART ON THE GEOLOCATION DATA, THAT THE ELECTRONIC DEVICE IS WITHIN A THRESHOLD DISTANCE FROM A SERVICE ADDRESS 604

DETECT, BY THE ELECTRONIC DEVICE, THAT THE STATE IS A NON-DRIVING STATE 606

TRANSITION FROM PRESENTING, ON THE ELECTRONIC DEVICE, A SET OF DRIVING INSTRUCTIONS TO PRESENTING INSTRUCTIONS FOR PERFORMING A SERVICE AT THE SERVICE ADDRESS 608

FIG. 6

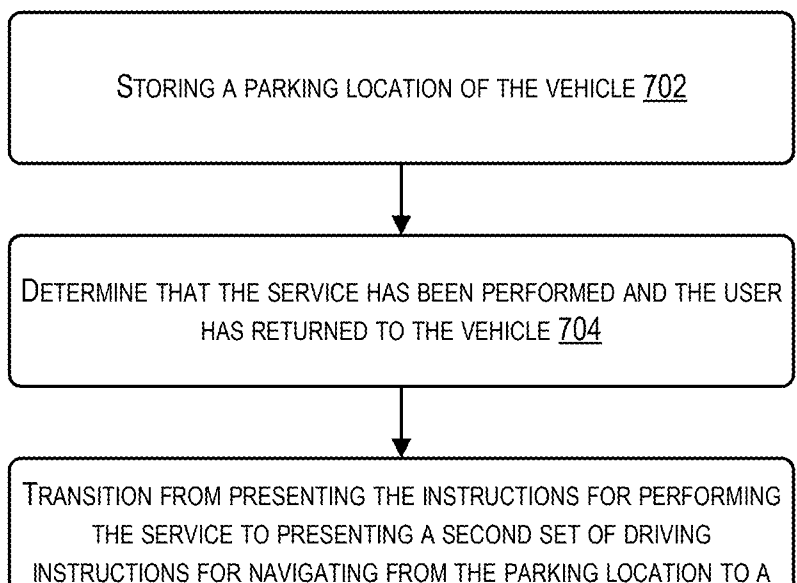
FIG. 7

AUTOMATING ACTION DETECTION AND PROGRESSION USING REAL-TIME CLASSIFICATION MODEL

BACKGROUND

Different computing services are available to improve user experiences with item deliveries. For instance, a driver can receive a map of the delivery location on their device. The driver may also receive item information or delivery instructions. Drivers may interact with a service on their device to request item information, delivery instructions, navigation instructions, etc

BRIEF DESCRIPTION OF THE DRAWINGS

Various embodiments in accordance with the present disclosure will be described with reference to the drawings, in which:

FIG. 6 illustrates an example flowchart showing a process for implementing techniques related to automating action detection and progression presented by an electronic device using real-time machine learning, according to at least one example;

FIG. 7 illustrates another example flowchart showing a process for implementing techniques related to automating action detection and progression presented by an electronic device using real-time machine learning, according to at least one example;

DETAILED DESCRIPTION

Figure 1:
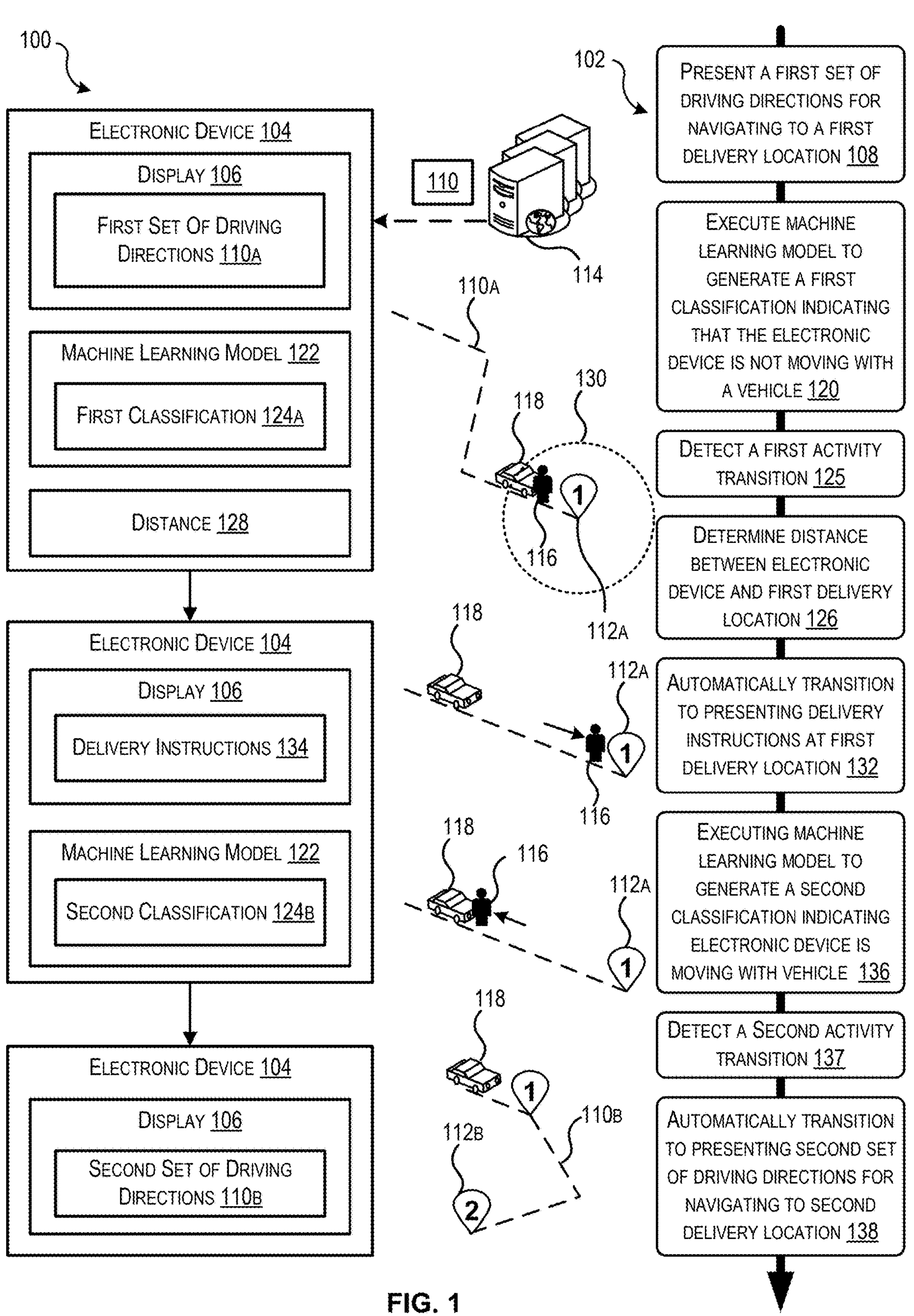
FIG. 1 illustrates an example block diagram and associated flowchart showing a process for implementing techniques relating to automating action detection and progression presented by an electronic device using real-time machine learning, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to, among other things, automating action detection and progression presented on an electronic device using real-time machine learning to classify actions. A user (e.g., a delivery driver) may move through a service workflow such as delivering items at delivery locations by interacting with an application on an electronic device (e.g., a smartphone). The application may present instructions for the user, such as navigation instructions or instructions for performing a service such as a delivery. As the user is navigating to a service address, the electronic device may detect geolocation data and motion data such as accelerometer data, gyroscope data, and magnetometer data. The electronic device can locally execute a machine learning model that can use the geolocation data and motion data to classify a state of the electronic device with respect to motion. For example, the state may classify a driving state (e.g., that the user of the electronic device is driving a vehicle) or a non-driving state (e.g., that the user of the electronic device is not driving a vehicle because, e.g., the user may instead be walking). In some examples, the classification may be a binary classification of the driving state or the non-driving state. In other examples, the classification may include additional states or sub-states. The electronic device may display the navigation instructions until the electronic device detects a trigger condition. The trigger condition can involve generating a classification of "not driving" while the electronic device detects that the electronic device is within a threshold distance from the service address. Once the trigger condition is met, the application can automatically transition from presenting navigation instructions to presenting instructions for performing the service. For example, the instructions may identify a package and delivery instructions for the package. The application may automatically transition to presenting navigation instructions to the next service address for the user once another trigger condition is met. The other trigger condition may involve the machine learning model generating another classification indicating that the user is driving, or by detecting that the electronic device has returned to the vehicle. This automated action detection and automatic progression can repeat as the user navigates to the next service address.

Turning now to a particular example, a delivery driver that delivers hundreds of packages a day may need to know how to navigate to a delivery location and which packages to drop off at the delivery location, followed by where to go for the next delivery location. The flow of information for this cyclic process can be presented through a sequence of user interface changes on a delivery application executing on the delivery driver's smartphone. Conventionally, the delivery driver may interact with interface elements (e.g., buttons) on the delivery application to advance to a next step in the delivery workflow. Such interactions may serve as activity indicators triggering data collection and state transitions within the delivery application. But requiring the delivery driver to interact with the delivery application to advance to the next step in the delivery workflow may reduce efficiency.

For instance, although a single button click may add an insignificant amount of cognitive or physical burden on the delivery driver, this can quickly add up as the number of deliveries increase. In some cases, each delivery may involve eight button clicks and a delivery driver may deliver about 250 packages a day, resulting in about 2000 button clicks in one day. Further, if the delivery driver clicks a button at the wrong time, the triggered data collection may result in inaccurate information. For instance, conventionally, a parking location may be stored when a delivery driver clicks an "I've Parked" button. The delivery driver can click the "I've Parked" button anywhere inside an arrival geofence to transition to a package overview screen. It is common for delivery drivers to press the "I've Parked" button and then continue driving up to another 50 meters, leading to the stored parking location not matching the actual parking location. The route to the next delivery address is planned from the stored parking location. So, when the delivery driver starts driving after completing a delivery, the navigation system for the application may evaluate the current location against the planned route. If the current location differs from the stored parking location, this will result in recalculation to a new route, also known as a reroute. For instance, a delivery driver may press the "I've Parked" button while driving down a road that ends in a cul-de-sac but may actually stop the vehicle after doing a U-turn. The planned route may vend a U-turn, not knowing that the driver has already made this maneuver, which when followed may lead the vehicle back into the cul-de-sac causing confusion and a reroute to occur. Reroutes can cause driver confusion and time wasted waiting for a new reroute.

Instead of requiring button clicks to advance to the next step of the delivery workflow, the smartphone can use a classification model that classifies activities given observations from global positioning system (GPS) sensors and inertial measurement unit (IMU) sensors on the smartphone to automatically advance to next steps without user interaction. The GPS sensor can provide latitude and longitude coordinates with timestamps, and the IMU sensor's three-dimensional accelerometer and gyroscope can provide accelerations and angular velocities along the x, y, and z axes with timestamps. GPS data and IMU data within a time window can be fed into the classification model. The classification model can output an activity prediction, which can represent the activity of the delivery driver at the last moment of the input time window. The activity prediction may predict whether the delivery driver is driving or not driving.

The smartphone may execute the classification model each time the GPS sensor detects a change in GPS data. The smartphone may continue displaying the navigation instructions to the delivery address until a first trigger condition is met. The first trigger condition can include the classification model classifying the delivery driver as not driving (e.g., walking) when the smartphone is detected to be within an arrival geofence (e.g., within a threshold distance from the delivery address). This can indicate that the delivery driver has exited the vehicle to walk to the delivery address and complete the delivery. The smartphone may store a parking location of the vehicle at the location at which the first trigger condition was met. Upon meeting the first trigger condition, the application can automatically transition from presenting navigation instructions to presenting delivery information. The delivery information may identify the package to be delivered, delivery instructions (e.g., instructing the delivery driver to deliver the package to the front door, back porch, etc.), and navigation instructions for walking from the parking location to the delivery address.

In some examples, the smartphone may also automatically transition to the next step of the delivery workflow in the application by detecting when the delivery driver has returned to the vehicle (e.g., a second trigger condition). The second trigger condition may be met when the smartphone detects, from GPS data or motion data, that the smartphone is located within a threshold distance from the parking location. This can indicate that the delivery driver has returned to the vehicle. The second trigger condition may also be met if the smartphone detects, from GPS data or motion data, that the smartphone is moving at a velocity exceeding a velocity threshold. This can indicate that the delivery driver is driving the vehicle again rather than walking. Additionally or alternatively, the second trigger condition can be met when the machine learning model classifies the delivery driver as driving. When the second trigger condition is met, the smartphone can automatically transition the application from presenting the delivery instructions to presenting navigation instructions to the next delivery in the delivery workflow.

Techniques described herein improve the functioning of electronic devices that provide navigation instructions and service instructions for drivers navigating to service addresses to perform services. Conventional techniques may rely on drivers manually interacting with an electronic device to indicate they have parked or are ready to begin navigation to the next service address. But some drivers may not accurately report parking location or completion of services. Millions of reroutes per year can be attributed to inaccuracies in a vehicle's parking location or in prematurely starting navigation while walking back to the vehicle. Further, some drivers may move and reparked the vehicle, making the manually reported parking location stale. Such reroutes may unnecessarily consume computing resources for the electronic device. In contrast, techniques described herein can more accurately detect parking location based on geolocation data and/or motion data, and without relying on potentially inaccurate user input, thus preventing unnecessary reroutes from incorrect parking locations and reducing unnecessary consumption of computing resources. Further, executing the machine learning model locally on the electronic device may reduce latency and consume less computing resources compared to accessing remote machine learning models.

In addition, techniques described herein can provide technological advantages over leveraging speed of the driver, determined using geolocation data, and by enforcing an arrival geofence around the service address. For instance, using conventional techniques, it may be difficult to differentiate between driving at slow speeds and walking. This may also not address the issue of geolocation data noise in urban canyons or unanticipated driver behavior. In contrast, embodiments described herein use geolocation data as well as IMU data to classify driver activity. In situations where geolocation data is unreliable or unavailable, such as in a parking garage, the IMU data alone may be provided to the machine learning model to generate classifications of driver activity. Thus, the electronic device may still successfully transition between presentation of navigation instructions and service instructions even in parking garages or other locations that may prevent detection of geolocation data.

In the interest of clarity of explanation, embodiments are described herein in connection with delivering items to delivery addresses. However, the embodiments are not limited as such. Instead, the embodiments may similarly apply to any services performed at service addresses to which users drive.

Turning now to the figures, FIG. 1 illustrates an example block diagram 100 and associated flowchart showing a process 102 for implementing techniques relating to automating action detection and progression presented by an electronic device using real-time machine learning, according to at least one example. The diagram 100 depicts devices, objects, and the like that correspond to the process 102. The process 102 can be performed by the electronic device 104, which includes a display 106 on which delivery instructions and navigation instructions can be presented to be used to perform a delivery of an item. The electronic device 104 may be a smartphone or other handheld user device used by a driver in a service vehicle (e.g., a delivery vehicle).

FIGS. 1, 6, 7, and 8 illustrate example flow diagrams showing processes 102, 600, 700, and 800 according to at least a few examples. Some or all of the process 102, 600, 700, and 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 108 by the electronic device 104 presenting a first set of driving direction 110*a* for navigating to a first delivery location 112*a*. The electronic device 104 can receive the first set of driving directions 110*a* from a service provider 114. The service provider 114 can be a server, such as an edge server, a set of servers in a cloud computing service, a virtual computing instance, etc. that is remote. In some examples, the electronic device 104 may receive the first set of driving directions 110*a* from the service provider 114 during navigation. In other examples, the first set of driving directions 110*a* may be downloaded from the service provider 114 for offline use during navigation. The electronic device 104 may be used by a delivery driver 116 to navigate to the first delivery location 112*a* in a vehicle 118 to deliver an item at the first delivery location 112*a*. While the delivery driver 116 is driving to the first delivery location 112*a* using the first set of driving directions 110*a*, the electronic device 104 can detect geolocation data (e.g., via a GPS in the electronic device 104) and motion data (e.g., via an IMU in the electronic device 104). In some examples, the geolocation data may be detected at a frequency of up to 1 Hz, greater than 1 Hz, or other frequencies as may be appropriate. The motion data may be detected at a frequency of up to 100 Hz, greater than 100 Hz, or other frequencies as may be appropriate. The electronic device 104 may present, on the display 106, an option for the delivery driver 116 to provide permission for location tracking. The delivery driver 116 may interact with the electronic device 104 to select the option to provide permission. This can enable the electronic device 104 to detect the geolocation data and motion data. The geolocation data and motion data, to the extent that it is stored, can be stored in a privacy-preserving manner, such as by anonymizing stored data. Collection and of geolocation data and motion data can be performed on an as-needed basis and using best practices for location tracking. In some examples, geolocation data and motion data may be discarded after being provided as input to a machine learning model 122.

At block 120, the electronic device 104 can execute a machine learning model 122 to generate a first classification 124*a* indicating that the electronic device 104 is not moving with the vehicle 118. In other words, the delivery driver 116 may not be driving the vehicle 118. The machine learning model 122 can be a classification model with a temporal convolution network (TCN) architecture. The machine learning model 122 may be locally executed on the electronic device 104 in real time. For example, the electronic device 104 may execute the machine learning model 122 each time the geolocation data is detected. The electronic device 104 can execute the machine learning model 122 by providing an input of the geolocation data and the motion data. The machine learning model 122 can use input to generate binary classifications of a driving state or a non-driving state. The first classification 124*a* may indicate that the electronic device 104 is not moving with the vehicle 118. At block 125, the electronic device 104 can detect, based at least in part on the first classification 124*a*, a first activity transition of the user device 104 from moving with the vehicle 118 to not moving with the vehicle 118. The first activity transition may indicate that the delivery driver 116 has transitioned from driving the vehicle 118 to walking.

At block 126, the electronic device 104 can determine a distance 128 between the electronic device 104 and the first delivery location 112*a*. If the distance 128 is less than a threshold distance 130 (e.g., the electronic device 104 is within an arrival geofence of the first delivery location 112*a*), and the first classification 124*a* indicates that the delivery driver 116 is not driving the vehicle 118, this may indicate that the delivery driver 116 has exited the vehicle 118 to complete the delivery. For example, the delivery driver 116 may have parked the vehicle 118 and may be walking to the first delivery location 112*a*. The electronic device 104 may store a parking location of the vehicle 118.

At block 132, the electronic device 104 can automatically transition from presenting the first set of driving directions 110*a* to presenting delivery instructions 134 at the first delivery location 112*a* in response to detecting the first activity transition 125, and that the electronic device 104 has a distance 128 that is less than the threshold distance 130. The delivery instructions 134 may include information about the item to be delivered, instructions for how to deliver the item, walking directions to the first delivery location 112*a*, or any other instructions or information necessary to perform the delivery. The delivery driver 116 may walk to the first delivery location 112*a*, carrying the electronic device 104, and may use the delivery instructions 134 to complete the delivery of the item. Then, the delivery driver 116 may walk back to the vehicle 118. The electronic device 104 can continue to detect additional geolocation data and motion data.

At block 136, the electronic device 104 can execute the machine learning model 122 to generate a second classification 124*b* indicating that the electronic device 104 is moving with the vehicle 118 (e.g., the delivery driver 116 is driving the vehicle 118) based on an input of the additional geolocation data and motion data. This may indicate that the delivery driver 116 has completed the delivery at the first delivery location 112*a* and is ready for the next delivery in the delivery workflow. Additionally or alternatively, the electronic device 104 may determine, using geolocation data and motion data, that the delivery was completed by determining that the electronic device 104 is located at or near (e.g., within a threshold distance) the stored parking location. Or, the electronic device 104 may determine that the electronic device 104 is moving at a velocity that indicates that the delivery driver 116 is driving and not walking. At block 137, the electronic device 104 can detect, based at least in part on the second classification 124*b*, a second activity transition of the electronic device 104 from not moving with the vehicle 118 to moving with the vehicle 118. The second activity transition may indicate that the delivery driver 116 has transitioned from walking (e.g., to the first delivery location 112*a* or to the vehicle 118) and is now driving the vehicle 118.

At block 138, the electronic device 104 can automatically transition from presenting the delivery instructions 134 to presenting a second set of driving directions 110*b* from the parking location to a second delivery location 112*b* in response to detecting the second activity transition. The electronic device 104 may transmit the parking location to the service provider 114. The service provider 114 may generate the second set of driving directions 110*b* and may transmit the second set of driving directions 110*b* to the electronic device 104. Or, the electronic device 104 may generate the second set of driving directions 110*b*. The process 102 can continue until all deliveries in the workflow have been completed.

The sets of driving directions 110*a-b* and the delivery instructions 134 can be presented on the display 106 of the electronic device 104 as user interfaces that update as the delivery driver 116 navigates towards the delivery locations 112*a-b*. The user interfaces can also display any other information received from the service provider 114, information generated by the electronic device 104, etc. Examples of the user interfaces are depicted and described in further detail in FIG. 2.

Figure 2:
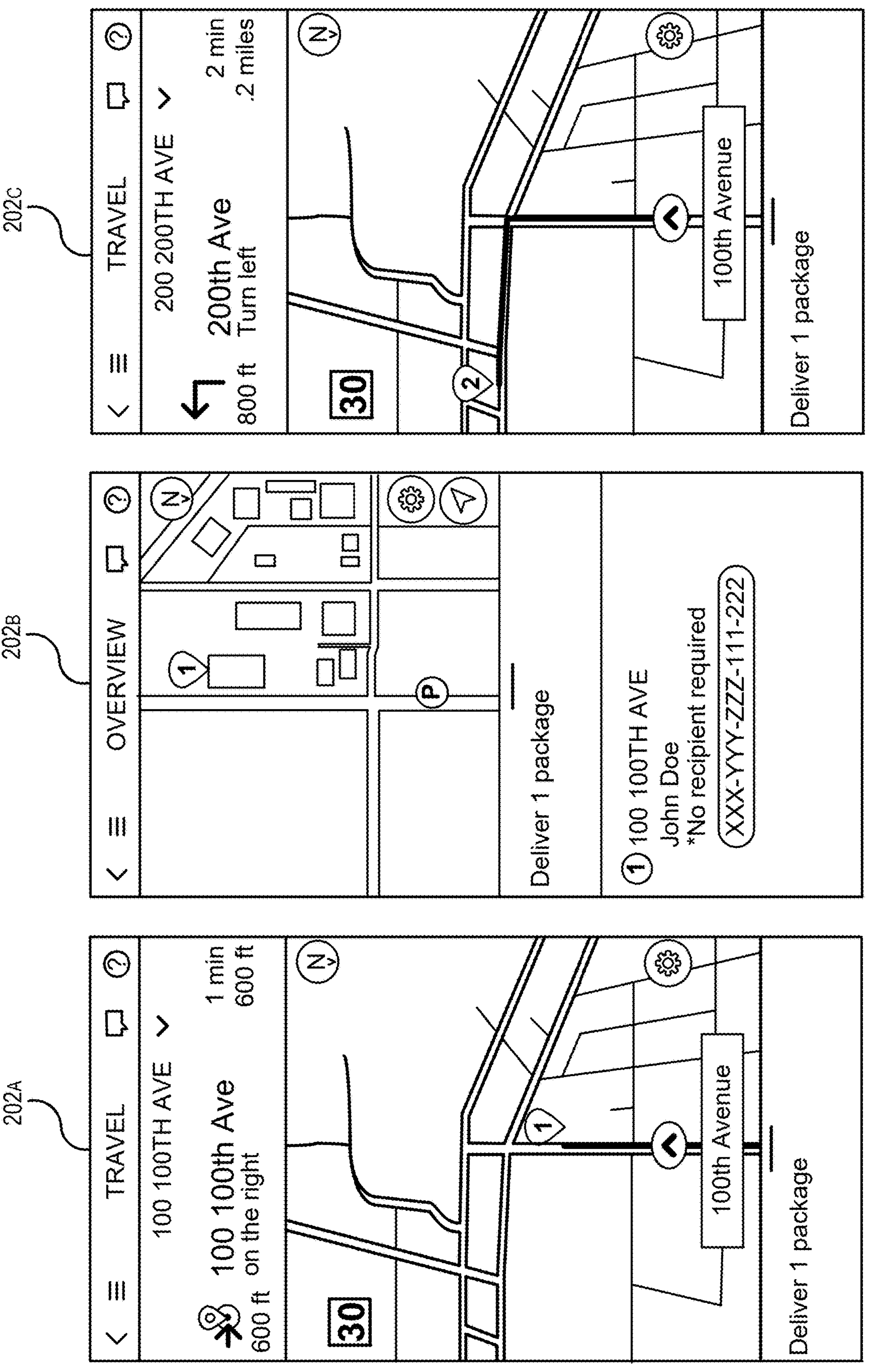
FIG. 2 illustrates example user interfaces for an electronic device displaying navigation instructions and delivery instructions, according to at least one example.

FIG. 2 illustrates example user interfaces 202*a-c* for an electronic device displaying navigation instructions and delivery instructions, according to at least one example. First user interface 202*a* is in a travel mode and displays a first set of driving directions to navigate to a first delivery location. In some examples, a delivery driver may be unable to park their vehicle directly at the first delivery location. Instead, the delivery driver may park the vehicle near the first delivery location and may walk the remainder of the distance to the first delivery location. The electronic device may use machine learning to detect the activity transition from driving to walking. The electronic device may store the parking location at the activity transition point.

When the activity transition to walking is detected, the electronic device may automatically present the second user interface 202*b*. The second user interface 202*b* shows an overview of the item delivery information, including the address, recipient, item identification, etc. The second user interface 202*b* may also depict the parking location of the vehicle. The delivery driver can use the information presented on the second user interface 202*b* to complete the delivery and then return to the vehicle. The electronic device may determine (e.g., via machine learning) that the electronic device has returned to the vehicle. Then, the electronic device may automatically present the third user interface 202*c*. The third user interface 202*c* may present a second set of driving directions to navigate from the parking location to a second delivery location for a second delivery.

Figure 3:
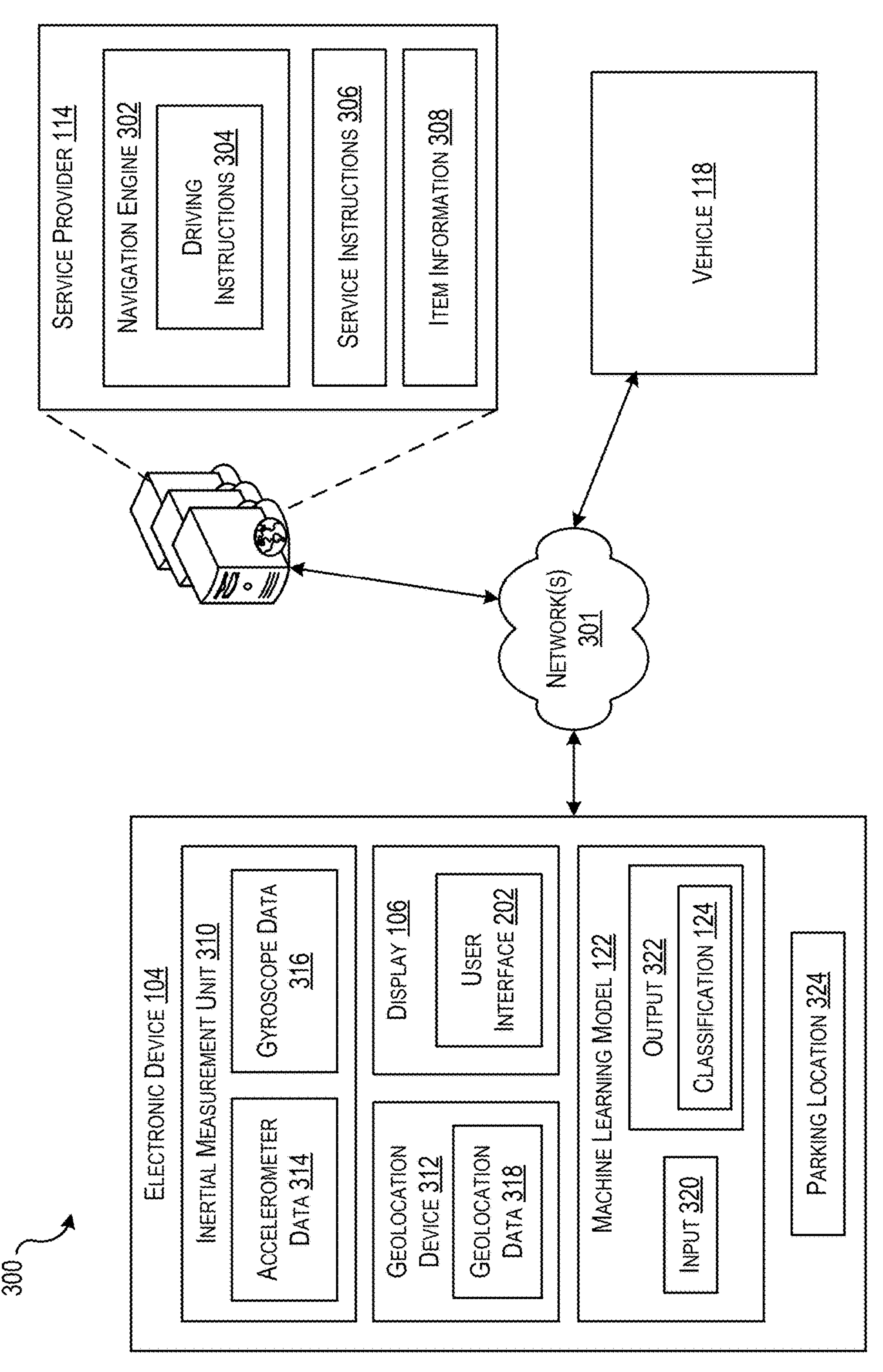
FIG. 3 illustrates an example block diagram of a system for automating action detection and progression presented by an electronic device using real-time machine learning, according to at least one example.

FIG. 3 illustrates an example block diagram of a system 300 for automating action detection and progression presented by an electronic device 104 using real-time machine learning, according to at least one example. The system 300 can include the electronic device 104, such as a smartphone or other handheld computing device, a service provider 114, and a vehicle 118 that are communicatively coupled via one or more network(s) 301. The service provider 114 can include a navigation engine 302 that can generate driving instructions 304 for navigating to a location (e.g., to a service address at which a service is to be performed, such as a delivery of an item). The service provider 114 can also generate, store, or access service instructions 306 associated with performing the service at the service address. For example, if the service is a delivery of an item, the service instructions 306 can include item information 308 identifying the item to be delivered at a particular delivery address. The service provider 114 can transmit the driving instructions 304 and the service instructions 306 to the electronic device via the network(s) 301, such as via the Internet. Additionally or alternatively, the electronic device 104 can include the navigation engine 302 and may locally generate the driving instructions 304 for navigating to the location. The electronic device 104 may in some examples generate, store, or access the service instructions 306. The electronic device 104 can present the driving instructions 304 or the service instructions 306 on its display 106 as part of a user interface 202 in response to detecting certain conditions. The electronic device 104 may be a portable electronic user device that the user can carry to and from deliveries.

The electronic device 104 can include an inertial measurement unit (IMU) 310 and a geolocation device 312. The IMU 310 can detect motion data. For example, the IMU 310 can include an accelerometer that detects accelerometer data 314 (e.g., linear accelerations of the electronic device 104 along x, y, and z axes at a given timestamp). The IMU 310 can also include a gyroscope that detects gyroscope data 316 (e.g., angular velocities of the electronic device 104 around the x, y, and z axes at a given timestamp). The IMU 310 may detect motion data at a frequency of up to 100 Hz, greater than 100 Hz, and at different frequencies, as appropriate. The geolocation device 312 can detect geolocation data 318 (e.g., latitude and longitude coordinates with a timestamp). The geolocation device 312 can detect geolocation data 318 at a frequency of up to 1 Hz, greater than 1 Hz, and at different frequencies, as appropriate. The electronic device 104 may subtract a gravity vector or direction and magnitude of the Earth's gravitational acceleration from the accelerometer data 314 to obtain user acceleration induced by a movement of a vehicle or by a user carrying the electronic device 104. The electronic device 104 can determine the user acceleration with the attitude of the electronic device 104 (e.g., the orientation in space) or with a band-pass filter.

The electronic device 104 can locally execute a machine learning model 122 in real time while the user is performing services such as driving to delivery locations and delivering items. The machine learning model 122 can be a temporal convolutional network (TCN) that is trained to classify user activity as driving or not driving based on an input 320 of accelerometer data 314, gyroscope data 316, and/or geolocation data 318. The machine learning model 122 can generate an output 322 including a classification 124 based on the input 320. The classification 124 can be an activity prediction in the form of a vector, whose elements represent the probability of each activity (e.g., driving or not driving).

The machine learning model 122 may be trained using training data, such as historical accelerometer data, historical gyroscope data, and historical geolocation data that may be annotated with activity labels. To mitigate the impact of sensor noise and improve model generalization, data perturbation can be leveraged. Data perturbation is a method that can be used to prevent a deep learning model from overfitting and may improve robustness to noisy labels. Many data perturbation methods used in typical machine learning tasks may not be applied to accelerometer data 314 or gyroscope data 316 directly due to affecting the physical meaning of the data. Therefore, data perturbation techniques such as cutout, axis rotation, axis flipping, and Gaussian noise can be applied.

Implementing cutout perturbations may involve randomly setting accelerometer data 314 and gyroscope data 316 within a continuous time window as zero. In an image, this perturbation results in a square area without value. For embodiments described herein, given a time window of sensor data, this perturbation may erase certain readings. The length of the cutout window can be set to obey a Gaussian distribution and can be equally distributed in the input 320. There may be two physics meanings of the cutout perturbation: the IMU 310 may malfunction periodically, and there may be a temporary "stop" during activities, such as standing still during walking or stopping temporarily during driving.

Implementing axis rotation perturbations may involve rotating the reference frame of the IMU 310 twice by swapping the x, y, and z readings of all IMUs in the electronic device 104 simultaneously. There may be two physics meanings of the axis rotation. First, two new reference frames can be defined by rotating the original frame twice, that is, x→y, y→z, and z→x, as well as x→z, y→x, and z→y. Second, the electronic device 104 may be at different attitudes during activities. For example, while the user is driving, the electronic device 104 may be placed on a phone holder, on a dashboard of the vehicle, in a pocket, on a passenger seat, etc. Implementing axis flipping can switch the readings of the accelerometer data 314 and the gyroscope data 316 to the opposite sign. There may be two physics meanings of axis flipping. First, a new reference frame is defined by flipping the axes. Second, during activities, the electronic device may be in completely opposite attitudes. Implementing Gaussian noise perturbations may involve adding random noise that obeys Gaussian distribution to accelerometer data 314, gyroscope data 316, or geolocation data 318. The random noise can simulate the noise in sensor readings.

To deal with inaccuracies in human annotated labels, specifically during the activity transition period, a pseudo-class factoring lower confidence can be introduced. For example, in the case of binary classification 124 of driving or not driving, when transforming activity labels into one-hot embeddings of [1, 0] if driving is assigned and [0, 1] if driving is not assigned, then a pseudo-class of [0.5, 0.5] can be assigned. The pseudo-class can allow the machine learning model 122 to handle gradual activity transitions, which can facilitate faster model convergence and can reduce the likelihood of misclassifications.

Further, to avoid model flicker or instantaneous class changes caused by noise, a post-processing step with a hysteresis switch can be used. The idea of a hysteresis switch is to use a threshold to select predictions with relatively high confidence, and to keep the prediction unchanged until the model gives another prediction with relatively high confidence. For example, in the case of binary classification, the threshold may be 0.8. When the maximum element in the output 322 is less than 0.8 (e.g., [0.6, 0.4], [0.3, 0.7]), the previous prediction with a confidence over 0.8 may be preserved as the current prediction. When the maximum element of the output 322 exceeds 0.8, the prediction can be updated accordingly.

It may be beneficial to prioritize real-time constraints and resource consumption when deploying the machine learning model 122 to the electronic device 104. The input 320 may include accelerometer data 314, gyroscope data 316, and geolocation data 318 detected within a recent time window. To minimize memory consumption, in some examples the time window may be limited to 16 seconds with geolocation data 318 detected at a frequency limit of 1 Hz (or any suitable frequency limit) and accelerometer data 314 and gyroscope data 316 detected at a frequency limit of 20 Hz (or any suitable frequency limit). To minimize processing, in some examples the machine learning model 122 may be invoked on latitude or longitude changes in the geolocation data 318 instead of running at a fixed interval. This may cause activity transitions to be missed in areas in which geolocation data 318 is unable to be detected, such as within parking structures, but this can be addressed with a wakeup timer. For example, if no change in geolocation data 318 is detected within a threshold amount of time, the machine learning model 122 may be executed with an input 320 consisting of accelerometer data 314 and gyroscope data 316 to generate the output 322 of the classification 124.

The machine learning model 122 can periodically produce classifications 124 as the user is performing services such as driving to a delivery location. The electronic device 104 may determine that an activity transition from driving to walking has occurred when the classification 124 predicts that the electronic device 104 is not moving with the vehicle 118 (e.g., the user is not driving) and the electronic device 104 determines that the electronic device 104 is less than a threshold distance away from the delivery location. When the activity transition is detected, the electronic device 104 can store the parking location 324 of the vehicle 118. The electronic device 104 may also store the side of the street on which the vehicle 118 is parked. For example, the electronic device 104 may use trace snapping to retrieve the corresponding road service marker (RSM) segment. This RSM segment can encode both parking location and the side of the street of the vehicle 118. A trace containing only the previous driving points can be snapped to obtain the parked RSM segment. Then, premature start of navigation while walking can be enabled by filtering walking points from reaching the snapper.

In some examples, the electronic device 104 may have a Bluetooth or other short-range wireless connection to the vehicle 118. The Bluetooth connection can be used to refine the parking location 324. For example, the electronic device 104 may detect when the electronic device 104 loses Bluetooth connection (e.g., from walking away from the vehicle 118) or regains Bluetooth connection (e.g., from walking back to the vehicle 118). The distance from the parking location 324 at which the electronic device 104 loses or regains Bluetooth connection can be used to update the parking location 324, such as by comparing the distance to a known range of the Bluetooth connection.

When the activity transition from driving to non-driving (e.g., walking) is detected, the electronic device 104 can transition from presenting the driving instructions 304 on the display 106 to presenting the service instructions 306. The user may use the service instructions 306 presented on the electronic device 104 to complete the service (e.g., deliver an item). In some examples, the service instructions 306 may include walking directions (e.g., from the service provider 114) to the delivery location and/or back to the parking location 324.

In some examples, the machine learning model 122 may generate finer classifications than the binary of driving or not driving. For example, the machine learning model 122 may classify, based on the input 320, user activity as indicating that the user (e.g., the vehicle 118) is stopped at a stoplight, a stop sign, a traffic light, or due to a traffic jam. The machine learning model 122 may generate an overall classification 124 of "driving" if any such sub-classifications are identified. This can differentiate between the vehicle 118 stopping during navigation (e.g., while still driving) versus parking the vehicle 118.

In some examples, the electronic device 104 may also automatically transition to the next step of the service workflow by detecting the next activity transition when the user switches from walking (e.g., back to the parking location 324) to driving the vehicle 118. The electronic device 104 may determine, such as based on the geolocation data 318, that electronic device 104 is once again located at or near the parking location 324. Additionally or alternatively, the electronic device 104 may determine, such as based on the accelerometer data 314, that the speed of the electronic device 104 indicates that the user is driving the car. In some examples, the electronic device 104 may detect the activity transition based on the machine learning model 122 generating a classification 124 indicating that the user is driving the vehicle 118. Upon detecting the activity transition, the electronic device 104 can automatically retrieve and present driving instructions 304 to the next service address in the service workflow.

Figure 4:
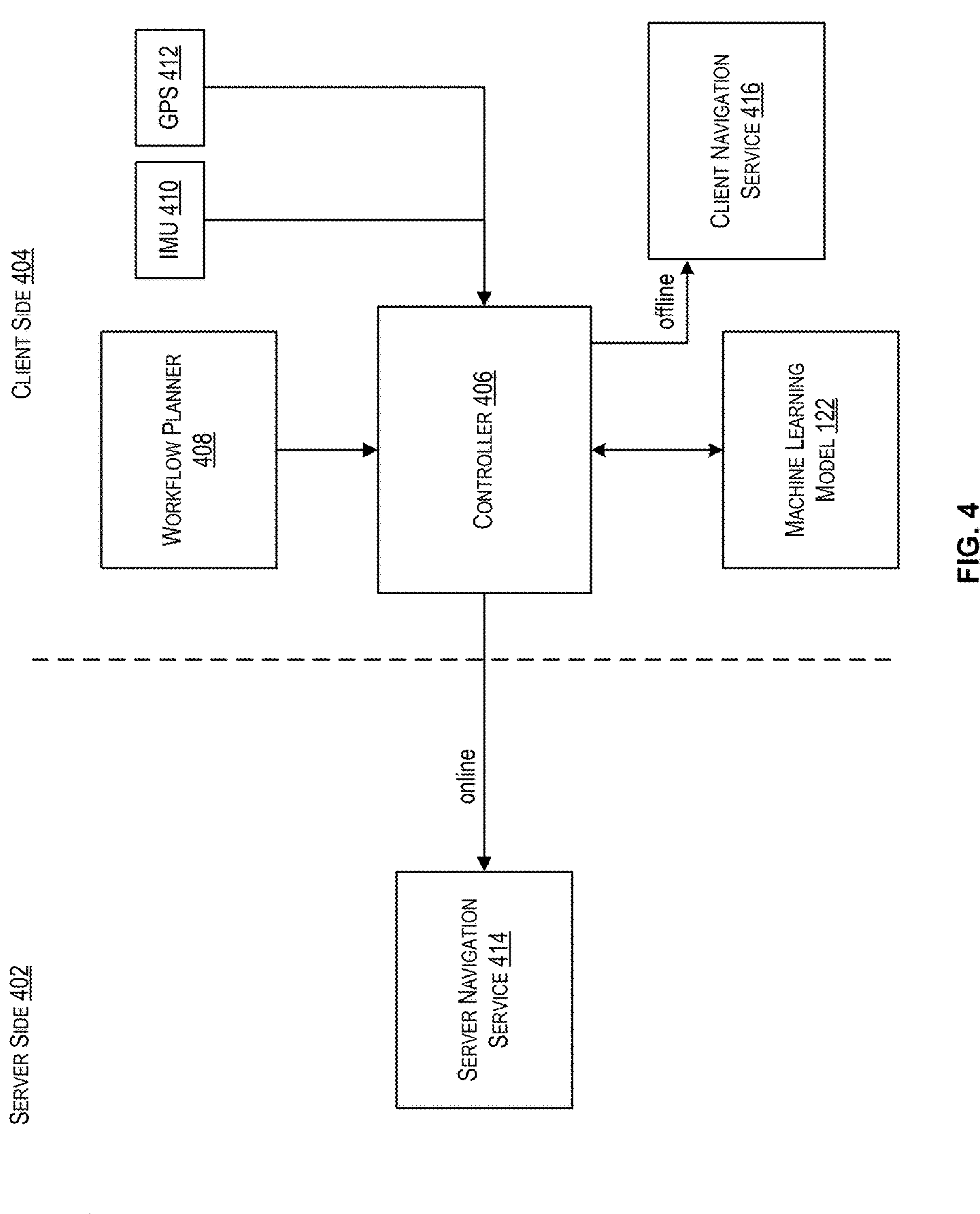
FIG. 4 illustrates an example block diagram of a server side and a client side of a service application providing driving instructions, according to at least one example.

FIG. 4 illustrates an example block diagram of a server side 402 and a client side 404 of a service application 400 providing driving instructions, according to at least one example. The service application 400 may be responsible for updating the user interface of an electronic device for a driver (e.g., a delivery driver). The server side 402 may be executed by the service provider 114 of FIGS. 1 and 3. The client side 404 may be executed by the electronic device 104 of FIGS. 1 and 3.

At the start of a shift (e.g., a delivery shift), the workflow planner 408 can configure each of the services on the client side 404 and can provide a list of service locations (e.g., delivery addresses) to the controller 406. The controller 406 can request a route plan for the next three stops in the list of service locations from a server navigation service 414 on the server side 402. The controller 406 can also receive location updates from an IMU 410 (e.g., an accelerometer, gyroscope, and magnetometer) at, for example, 100 Hz and from a GPS 412 at, for example, 1 Hz. In some examples, the controller 406 may receive location updates at other suitable frequencies.

When the driver starts navigation at the beginning of the workflow, or when the service application 400 detects an activity transition from walking to driving, a route request can be sent to the server navigation service 414 on the server side 402 as well as to the client navigation service 416 on the client side 404. To determine the origin of the route request, the server navigation service 414 and/or the client navigation service 416 can invoke a snapper service with a trace of the last 20 (or any suitable number) GPS points and orientations to set the parking location and orientation of the vehicle on the best map-matched road segment. This may assume that the electronic device is inside the vehicle but may be oriented arbitrarily. The server navigation service 414 can return a route plan that can maneuver factoring real-time traffic through a shortest path service. If the controller 406 receives a response from the server navigation service 414 within a specified time interval, the controller 406 will accept the response and will ignore the route plan generated by the client navigation service 416, as the client navigation service 416 may execute offline and may not factor in traffic. Once the route plan is received, the route from the parking location to the next service address can be monitored by a route line snapper through a set of simple path divergence heuristics. If there is a significant divergence, a reroute request may be raised. The controller 406 may also invoke the machine learning model 122 to generate classifications of the electronic device with respect to the vehicle (e.g., driving or not driving) based on data from the IMU 410 and GPS 412.

In some examples, if navigation is invoked while walking (e.g., when the machine learning model 122 has generated a classification of a non-driving state), the controller 406 can remove the GPS data detected while the driver is walking from driving traces. This can prevent invalid trace snapping. In other words, navigation may be suppressed when the machine learning model 122 generates classifications indicating that the driver is walking and not driving. At the start of driving, the resulting trace to the trace snapper may not contain sufficient GPS points given that walking points are suppressed. In some cases, these GPS coordinates may be densely clustered, making the trace inappropriate for snapping due to the lack of features in its trajectory. To address this issue, GPS points classified as in a driving state leading up to the vehicle's parked location can be appended to the trace, providing longer trajectories for more accurate snapping.

In some cases, the trace snapper may assume a change in latitude (e.g., from North to South) as detected by the GPS 412 over the trace period was due to a possible U-turn between parallel RSM segments. Such situations may occur in the presence of sharp turns or in locations where poor GPS accuracy or missing RSM segments lead to inaccurate snaps. The corresponding IMU data cannot violate the spatiotemporal constraints, which may result in a mismatch between angular changes computed by the IMU 410 and the trace snapper. While driving, when the difference between data detected by the IMU 410 and the GPS 412 is significant (e.g., >90°, the difference can be reconciled by interpolating GPS points with IMU data and, in some examples, dropping conflicting points from future traces.

When GPS points are snapped to the nearest RSM segment, the trace snapper may assume complete knowledge of the underlying map and decent GPS accuracy. At times, the snapped location may be relatively far away from the corresponding GPS position. Typically the error in distance may be less than 10 meters, but in certain urban areas (e.g., large cities) the average error may increase to 30 meters. Thus, the planar displacement measured by the accelerometer and the gyroscope in the IMU 410 may be compared against the distance indicated by the GPS 412 to ascertain the plausibility of the snapped location.

Similarly, the difference in distance may be relatively large if the underlying RSM network is incomplete in situations where the vehicle enters unmapped areas, such as parking lots or service roads. This distance can be monitored to remove such points from trace snapping, and to suppress reroutes until the GPS position overlaps a known RSM segment.

Figure 5:
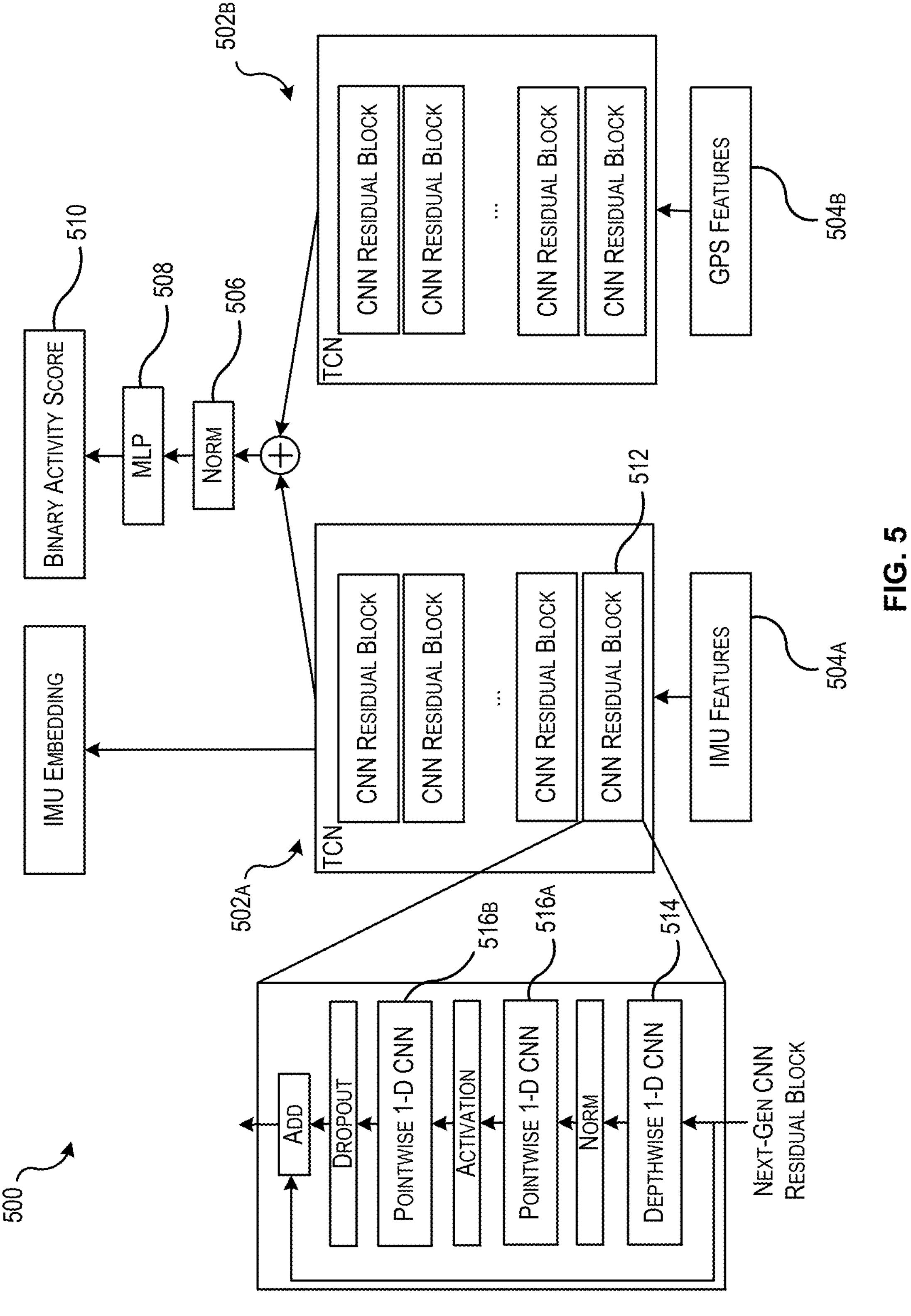
FIG. 5 illustrates an example block diagram of an example architecture of a machine learning model used to classify driver activity, according to at least one example.

FIG. 5 illustrates an example block diagram of an example architecture 500 of a machine learning model, such as the machine learning model 122 of FIGS. 1, 3, and 4, used to classify driver activity, according to at least one example. The machine learning model 122 may be a neural network. The architecture 500 of the machine learning model 122 may include two parallel temporal convolutional networks (TCNs) 502*a-b*. The input to the machine learning model 122 can include a first matrix 504*a* containing features from inertial measurement unit (IMU) data and a second matrix 504*b* containing features from global positioning system (GPS) data (e.g., geolocation data). The first matrix 504*a* from IMU data can contain accelerometer data and gyroscope data read within a time window. The second matrix 504*b* from GPS data can contain the speed as well as the cosine and sine of rotational velocity calculated by differentiating the GPS data.

The matrices 504*a-b* can be fed into their respective, independent TCNs 502*a-b*. The outputs of the TCNs 502*a-b*, which are embeddings that contain the information from the input data, can be concatenated and fed into a normalization layer 506 and a multi-perception module 508 to produce a binary activity score 510 (e.g., an activity prediction of a driving state or a non-driving state). The binary activity score 510 can represent the activity at the last moment of the input time window. The binary activity score 510 can be in the form of a vector whose elements represent the probability of each activity.

A TCN is a neural network architecture that can yield a prediction or a sequence of predictions according to time series of inputs. TCNs can employ causal convolutions and dilations such that the TCNs are adaptive for sequential data with its temporality and large receptive fields. The temporality can mean that the output of the TCN may only be exposed to the inputs temporally before the output, while the large receptive fields are due to the usage of dilations. A TCH can be a stack of convolutional neural network (CNN) residual blocks 512. A conventional CNN residual block may contain two stacks of CNN, normalization, activation function, and dropout layers. Embodiments described herein involve CNN residual blocks 512 that decomposes a CNN layer into a depthwise CNN layer 514 and two point-wise CNN layers 516*a-b* to achieve better learning capability with less learnable parameters compared to conventional CNN residual blocks.

FIG. 6 illustrates an example flowchart showing a process 600 for implementing techniques related to automating action detection and progression presented by an electronic device using real-time machine learning, according to at least one example. The electronic device 104 of FIGS. 1 and 3 may perform the process 600. In some examples, the service provider 114 of FIGS. 1 and 3 may perform some or all parts of the process 600.

At block 602, the process 600 includes the electronic device 104 executing, based at least in part on an input comprising geolocation data and motion data detected by an electronic device, a machine learning model to generate a classification. The classification may indicate a state of the electronic device 104 with respect to motion. The state may be a driving state (e.g., indicating that a user of the electronic device is driving a vehicle) or a non-driving state (e.g., indicating that the user of the electronic device is not driving the vehicle and may instead be walking). While the electronic device 104 is executing the machine learning model, the electronic device 104 may be presenting a set of driving instructions (e.g., turn-by-turn navigation) that navigates the user to a service address for the purpose of performing a service at the service address.

In some examples, the electronic device 104 may execute the machine learning model in response to detecting a change in geolocation data. The input may include geolocation data and motion data detected within a predefined time window, such as the last 16 seconds (although any suitable time window may be used). The machine learning model can generate the classification for an end time (e.g., the last moment) of the predefined time window. Alternatively, the electronic device 104 may determine that geolocation data has not been detected by the electronic device for more than a threshold amount of time. In response, the electronic device 104 can execute the machine learning model based on a second input of second motion data. The motion data may include accelerometer data and gyroscope data detected by an inertial measurement unit (IMU) of the electronic device 104. The machine learning model may be a neural network and may include a first temporal convolutional network (TCN) and a second TCN. The first TCN can receive the accelerometer data and the gyroscope data as input. The second TCN can receive the geolocational data as input. The classification can be based at least in part on a first output generated by the first TCN and a second output generated by the second TCN.

At block 604, the process 600 includes the electronic device 104 detecting, based at least in part on the geolocation data, that the electronic device is within a threshold distance from the service address. The threshold distance may be an arrival geofence for the service address. The arrival geofence may be an area in which the user can park and walk the remainder of the distance to the service address. In an example, the threshold distance may be 0.2 miles or any other suitable distance.

At block 606, the process 600 includes the electronic device 104 detecting that the state is a non-driving state. For example, the electronic device 104 may detect that the state of the electronic device has transitioned from a previously classified driving state (e.g., the driver driving the vehicle and the electronic device 104 to a service address) to the non-driving state (e.g., the driver walking the electronic device 104 to the service address).

At block 608, the process 600 includes the electronic device 104 transitioning from presenting, on the electronic device 104, the set of driving instructions to presenting instructions for performing a service at the service address. The electronic device may present the instructions for performing the service in response to generating the classification that the electronic device 104 is in the non-driving state and detecting that the electronic device 104 is within the threshold distance from the service address, as this may indicate that the driver is walking to the service address to perform the service. The electronic device 104 may automatically transition from presenting the driving instructions to presenting the instructions for performing the service without requiring user input.

FIG. 7 illustrates another example flowchart showing a process 700 for implementing techniques related to automating action detection and progression presented by an electronic device using real-time machine learning, according to at least one example. The electronic device 104 of FIGS. 1 and 3 may perform the process 700. In some examples, the service provider 114 of FIGS. 1 and 3 may perform some or all parts of the process 700.

At block 702, the electronic device 104 may register and/or store a parking location of the vehicle. The electronic device 104 may determine the parking location of the vehicle based at least in part on identifying a location of the electronic device at a time that the classification (e.g., indicating an activity transition from a driving state to a non-driving state) was generated. In some examples, the identified parking location may override a manual parking location submitted by the user. In some examples, the electronic device 104 may have a Bluetooth connection with the vehicle. The parking location of the vehicle may be further determined based at least in part on detecting a location at which the electronic device 104 loses or regains a Bluetooth connection to the vehicle. In some examples, determining the parking location of the vehicle can include determining, based at least in part on the geolocation data or the motion data, at least one of an orientation or a parking side of the road of the vehicle at the activity transition. For example, the parking location may include the direction the vehicle was driving before parking, such as driving northbound or southbound on a particular road.

At block 704, the electronic device 104 may determine that the service has been performed and the electronic device is located at the vehicle. For example, the electronic device 104 may detect second motion data and second geolocation data. The electronic device 104 may execute the machine learning model to generate a second classification based on a second input of the second motion data and second geolocation data. The second classification may indicate that the electronic device is in a driving state (e.g., the user may be driving the vehicle). Thus, the electronic device 104 may determine that the service has been performed and the user has returned to the vehicle based on the second classification. In some examples, the machine learning model may additionally generate sub-classifications. For example, the machine learning model may classify the second input as at least one of being stopped at a stoplight, a stop sign, a traffic light, or due to a traffic jam. The second classification indicating that the electronic device 104 is in a driving state may be generated based at least in part on classifying the second input as at least one of being stopped at the stoplight, the stop sign, the traffic light, or due to the traffic jam.

Alternatively or additionally, the electronic device 104 may detect, based at least in part on the second geolocation and the second motion data, that the electronic device 104 is within a second threshold distance from the parking location or that the electronic device 104 has a velocity exceeding a velocity threshold. The electronic device 104 can determine that the service has been performed and the user has returned to the vehicle based at least in part on detecting that the electronic device 104 is within the second threshold distance or that the electronic device has the velocity exceeding the velocity threshold.

At block 706, the electronic device 104 may transition from presenting the instructions for performing the service to presenting a second set of driving instructions for navigating from the parking location to a second service address. The electronic device may automatically transition to presenting the second set of driving instructions in response to determining that the service has been performed and the electronic device is located at the vehicle.

Figure 8:
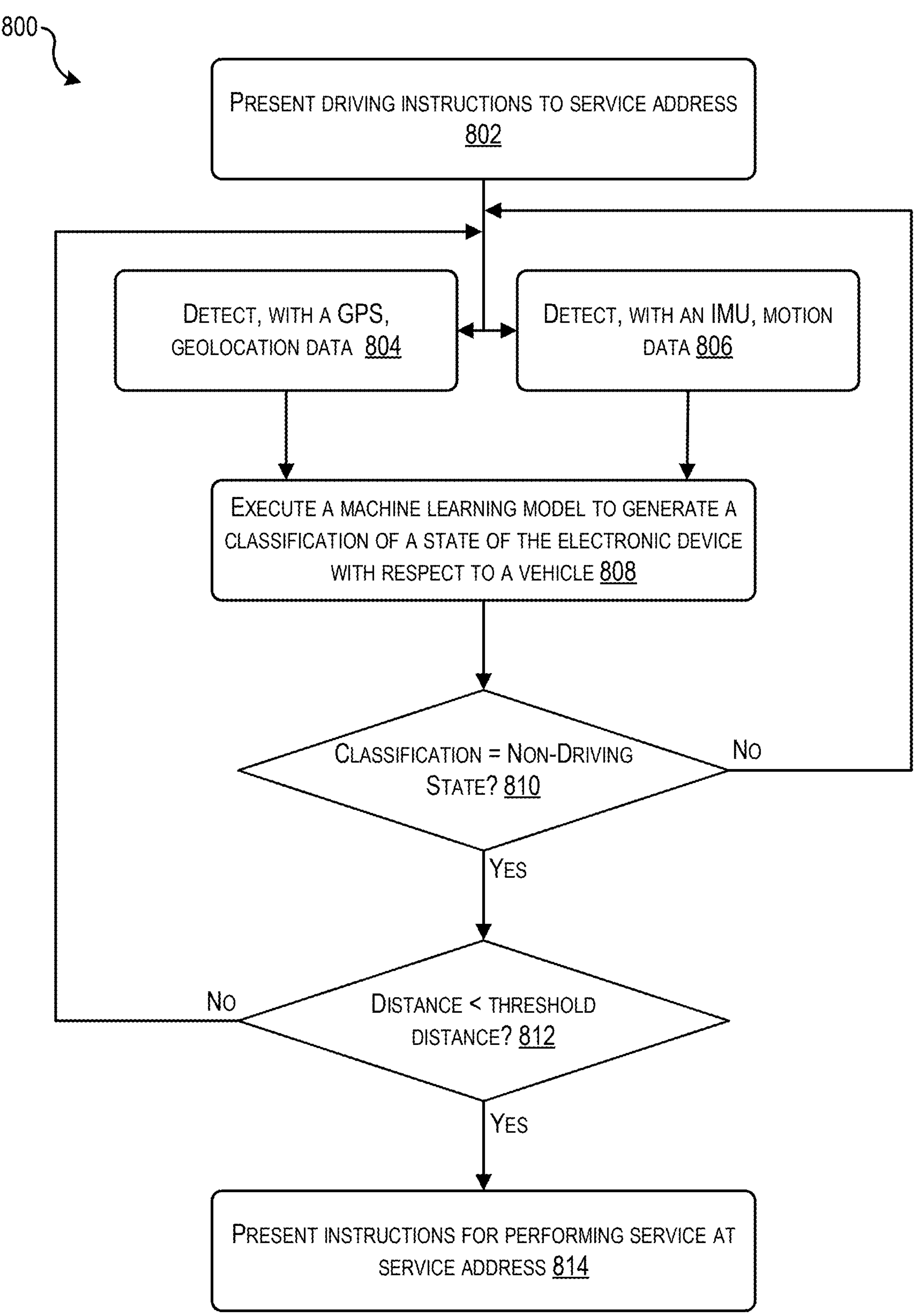
FIG. 8 illustrates another example flowchart showing a process for implementing techniques related to automating action detection and progression presented by an electronic device using real-time machine learning, according to at least one example.

FIG. 8 illustrates another example flowchart showing a process 800 for implementing techniques related to automating action detection and progression presented by an electronic device using real-time machine learning, according to at least one example. The electronic device 104 of FIGS. 1 and 3 may perform the process 800. In some examples, the service provider 114 of FIGS. 1 and 3 may perform some or all parts of the process 800.

At block 802, the electronic device 104 can present driving instructions for navigating to a service address. The driving instructions may be turn-by-turn navigation directing a user (e.g., a delivery driver) driving a vehicle to the service address so that the user can perform a service (e.g., deliver an item) at the service address. The service address may be a first service address in a workflow of service addresses that the user will visit to perform services.

At block 804, the electronic device 104 can detect, with a GPS, geolocation data for the electronic device 104. The GPS can detect geolocation data at a frequency of up to 1 Hz, greater than 1 Hz, or other frequencies as may be appropriate. At block 806, the electronic device 104 can detect, with an IMU, motion data for the electronic device 104. The motion data can include data detected by an accelerometer, a gyroscope, and a magnetometer in the IMU. The IMU can detect the motion data at a frequency of up to 100 Hz, greater than 100 Hz, or other frequencies as may be appropriate. The IMU and the GPS can be included in the electronic device 104, which in some examples may be a smart phone operated by the user while driving or performing services.

At block 808, the electronic device 104 can execute a machine learning model to generate a classification of a state of the electronic device 104 with respect to the vehicle (e.g., whether the electronic device 104 is moving with the vehicle or not moving with the vehicle). The electronic device 104 can execute the machine learning model by inputting the geolocation data and the motion data collected within a previous time window, such as the last 16 seconds. The machine learning model can use the geolocation data and the motion data to generate a classification of a driving state or a non-driving state at the last moment of the time window. In some examples, the electronic device 104 may execute the machine learning model to generate a classification each time that GPS detects geolocation data.

At block 810, the electronic device 104 can determine whether the classification indicates a non-driving state of the electronic device 104. If the classification indicates the non-driving state (e.g., indicating that the user is not driving), the process 800 can continue to block 812. If the classification indicates the driving state (e.g., indicating that the user is driving), the process 800 can continue to blocks 804 and 806, where additional geolocation data and motion data are collected to be input into the machine learning model.

At block 812, the electronic device 104 can determine whether a distance between the electronic device 104 and the service address is less than a threshold distance. The threshold distance may be a predefined distance from the service address, such as an arrival geofence. If the distance is less than the threshold distance, the process 800 can continue to block 814, as this may indicate that the user has parked the car and is walking the remainder of the distance to the service address. If the distance is greater than the threshold distance, the process 800 can continue to blocks 804 and 806, where additional geolocation data and motion data are collected to be input into the machine learning model.

At block 814, the electronic device 104 can present instructions for performing the service at the service address. The electronic device 104 may automatically transition from presenting the driving instructions to presenting the instructions for performing the service if the classification indicates the non-driving state and the distance is less than the threshold distance. The user may use the instructions to complete the service, such as delivering an item to the service address. The GPS and the IMU can continue to detect geolocation data and motion data while the user is walking to the service address.

Figure 9:
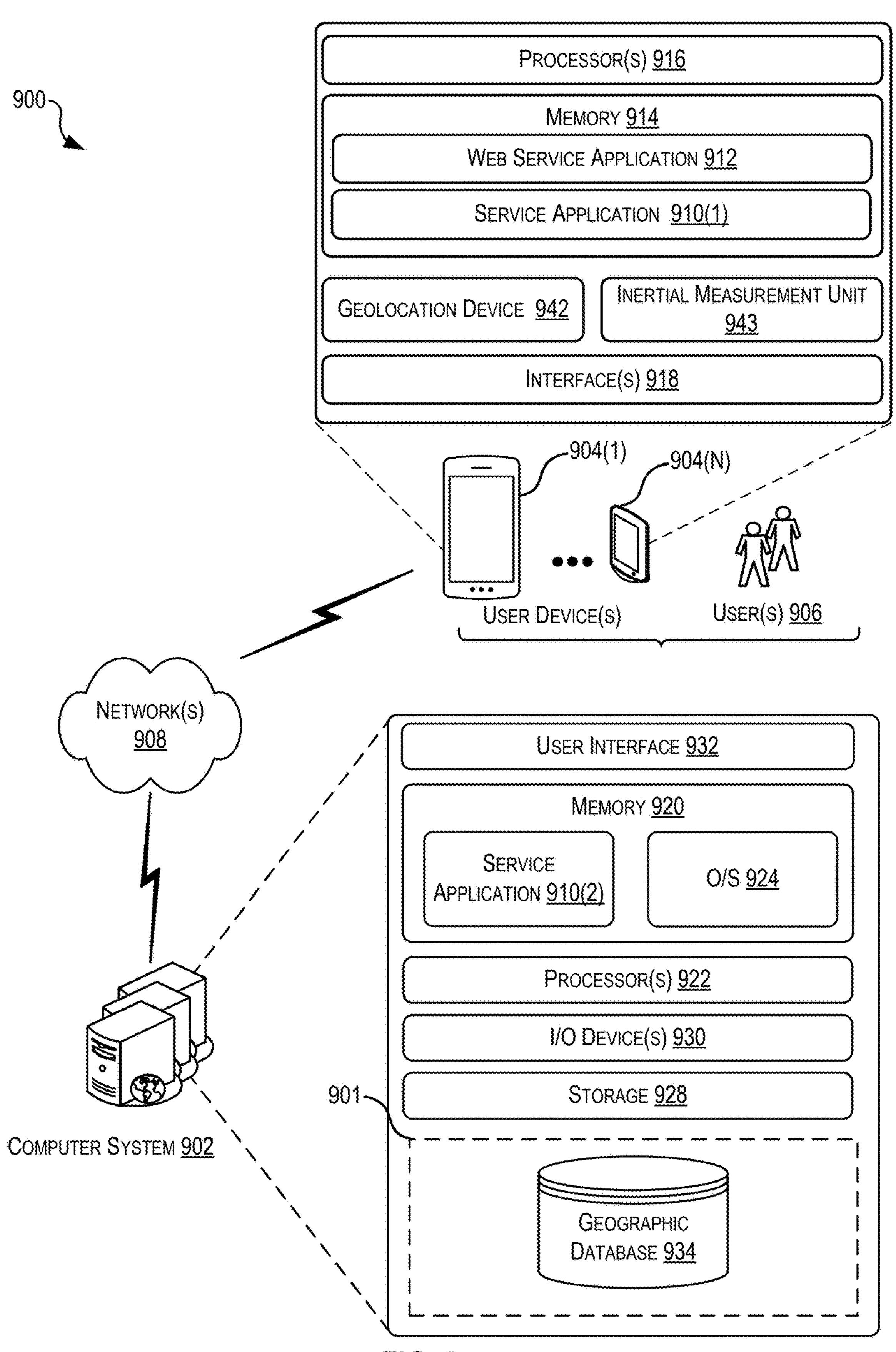
FIG. 9 illustrates an environment in which various embodiments can be implemented.

FIG. 9 illustrates aspects of an example environment 900 for implementing aspects in accordance with various embodiments. The environment 900 may include a computer system 902 (e.g., the service provider 114 described herein) in communication with one or more user devices 904(1)-904(N) (e.g., the electronic devices 104 described herein) via one or more networks 908 (hereinafter, "the network 908").

The user device 904 may be operable by one or more users 906 to interact with the computer system 902. The users 906 may be drivers, such as delivery drivers, that are navigating to a destination using the user device 904. The user device 904 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 904(1) is illustrated as a smartphone, while the user device 904(N) is illustrated as an example of a handheld mobile device.

The user device 904 may include a memory 914 and processor(s) 916. In the memory 914 may be stored program instructions that are loadable and executable on the processor(s) 916, as well as data generated during the execution of these programs. Depending on the configuration and type of user device 904, the memory 914 may be volatile (such as random access memory ("RAM")) and/or non-volatile (such as read-only memory (ROM), flash memory, etc.).

In some examples, the memory 914 may include a web service application 912 and a version of a service application 910 (e.g., 910(1)). The web service application 912 and/or the service application 910(1) may allow the user 906 to interact with the computer system 902 via the network 908. The user device 904 may also include one or more interfaces 918 to enable communication with other devices, systems, and the like. The service application 910, whether embodied in the user device 904 or the computer system 902, may be configured to perform the techniques described herein. For example, the service application 910 can determine driving instructions and service instructions for the user 906. The driving instructions may involve turn-by-turn navigation. The service application 910 can automatically transition between presenting driving instructions and service instructions by executing a machine learning model to identify activity transitions of the user 906, such as transitioning from walking to driving or vice versa. In an example, the service application 910 can include any other suitable devices, engines, modules, models, and the like.

The user device 904 can include a geolocation device 942 and an inertial measurement unit 943. In some examples, the geolocation device 942 can be communicatively coupled to the user device 904(1). The geolocation device 942 can determine a current location of the user device 904. For example, the geolocation device 942 may use network triangulation techniques, global positioning system (GPS), Wi-Fi location positioning, cellular network positioning, RFID tracking, etc. The current location detected by the geolocation device 942 can be displayed on the interfaces 918. The service application 910 can interact with the geolocation device 942 to generate driving directions for the user 906. For example, the geolocation device 942 can output location information related to the user device 904 to the service application 910. The service application 1710 can use the location information to determine a turn-by-turn route for the user 1706. The inertial measurement unit 943 may include an accelerometer, a gyroscope, and a magnetometer. The inertial measurement unit 943 may detect the specific force, angular rate, and orientation of the user device 904. Measurements detected by the geolocation device 942 and the inertial measurement unit 943 can be used as input to the machine learning model that classifies user driving activity.

Turning now to the details of the computer system 902, the computer system 902 may include one or more computer system computers, perhaps arranged in a cluster of servers or as a server farm, and may host web service applications. The function of the computer system 902 may be implemented a cloud-based environment such that individual components of the computer system 902 are virtual resources in a distributed environment.

The computer system 902 may include at least one memory 920 and one or more processing units (or processor(s)) 922. The processor 922 may be implemented as appropriate in hardware, computer-executable instructions, software, firmware, or combinations thereof. Computer-executable instruction, software, or firmware implementations of the processor 922 may include computer-executable or machine-executable instructions written in any suitable programming language to perform the various functions described. The memory 920 may include more than one memory and may be distributed throughout the computer system 902. The memory 920 may store program instructions that are loadable and executable on the processor(s) 922, as well as data generated during the execution of these programs. Depending on the configuration and type of memory including the computer system 902, the memory 920 may be volatile (such as RAM and/or non-volatile (such as read-only memory ("ROM"), flash memory, or other memory)). The memory 920 may include an operating system 924 and one or more application programs, modules, or services for implementing the features disclosed herein including at least a version of the service application 910 (e.g., 910(2)). For example, the service application 910(2) may perform the functionality described herein.

The computer system 902 may also include additional storage 928, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 928, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 902 and/or part of the user device 904.

The computer system 902 may also include input/output (I/O) device(s) and/or ports 930, such as for enabling connection with a keyboard, a mouse, a pen, a voice input device, a touch input device, a display, speakers, a printer, or other I/O device.

In some examples, the computer system 902 may also include one or more user interface(s) 932. The user interface 932 may be utilized by an operator, curator, or other authorized user to access portions of the computer system 902. In some examples, the user interface 932 may include a graphical user interface, voice interfaces, web-based applications, programmatic interfaces such as APIs, or other user interface configurations.

The computer system 902 may also include a data store 901. In some examples, the data store 901 may include one or more databases, data structures, or the like for storing and/or retaining information associated with the computer system 902 and which, in some examples, may be accessible by the user devices 904. The service application 910 is communicatively coupled (e.g., via a wired connection or a wireless connection) to the data store 901. The data store 901 includes a geographic database 934. In an example, the data store 901 can include any other suitable data, databases, libraries, and the like. The geographic database 934 can include geographic data, such as geolocations for addresses.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A portable electronic user device comprising:

a display;

a geolocation device;

an inertial measurement unit (IMU);

a memory configured to store computer-executable instructions; and a processor configured to access the memory and execute the computer-executable instructions to at least:

present, on the display, a first set of driving directions for navigating to a first delivery location;

execute a machine learning model to generate a first classification with respect to motion of the portable electronic user device based at least in part on a first input comprising first geolocation data detected by the geolocation device and first motion data detected by the IMU;

determine a distance between the portable electronic user device and the first delivery location based at least in part on the first geolocation data;

detecting, based at least in part on the first classification, a first activity transition of the portable electronic user device from moving with a vehicle to not moving with the vehicle;

responsive to (i) detecting the first activity transition and (ii) determining that the distance between the portable electronic user device and the first delivery location is less than a threshold distance:

automatically transition to presenting, on the display, instructions for a delivery to the first delivery location;

determine, based at least in part on the first geolocation data or the first motion data, a parking location of the vehicle, wherein the parking location includes an orientation comprising a direction that the vehicle was driving at the first activity transition; and subsequent to presenting the instructions for the delivery, executing the machine learning model to generate a second classification with respect to motion of the portable electronic user device based at least in part on a second input comprising second geolocation data detected by the geolocation device and second motion data detected by the IMU;

detecting, based at least in part on the second classification, a second activity transition of the portable electronic user device from not moving with the vehicle to moving with the vehicle; and responsive to detecting the second activity transition, automatically transition to presenting, on the display, a second set of driving directions for navigating to a second delivery location.

2. The portable electronic user device of claim 1, wherein the memory is configured to store additional computer-executable instructions, and the processor is configured to execute the additional computer-executable instructions to at least generate the first classification or the second classification responsive to detecting a change in geolocation data detected by the geolocation device.

3. The portable electronic user device of claim 1, wherein the memory is configured to store additional computer-executable instructions, and the processor is configured to execute the additional computer-executable instructions to at least:

register the parking location of the vehicle based at least in part on the first activity transition and on the first geolocation data, wherein the second set of driving directions originate at the parking location.

4. The portable electronic user device of claim 1, wherein the first input comprises the first geolocation data detected within a predefined time window and the first motion data detected within the predefined time window, and wherein the machine learning model is configured to generate the first classification for an end time of the predefined time window.

5. A computer-implemented method, comprising:

executing, by an electronic device and based at least in part on an input comprising geolocation data and motion data detected by the electronic device, a machine learning model to generate a classification indicating a state of the electronic device with respect to motion of a vehicle;

detecting, by the electronic device and based at least in part on the geolocation data, that the electronic device is within a threshold distance from a service address;

detecting, by the electronic device, that the state is a non-driving state;

determining, by the electronic device, an activity transition from a driving state to the detected non-driving state of the vehicle; and responsive to (i) determining the activity transition to the detected non-driving state and (ii) detecting that the electronic device is within the threshold distance from the service address:

transitioning from presenting, on the electronic device, a set of driving instructions to presenting instructions for performing a service at the service address; and determining, by the electronic device and based at least in part on the geolocation data or the motion data, a parking location of a vehicle, wherein the parking location includes an orientation comprising a direction that the vehicle was driving at the activity transition.

6. The computer-implemented method of claim 5, wherein the service address is a first service address, and wherein the method further comprises, subsequent to presenting the instructions for performing the service:

storing the parking location of a vehicle, wherein the parking location is a location at which the non-driving state was detected;

determining that the service has been performed and the electronic device is located at the vehicle; and responsive to determining that the service has been performed and the electronic device is located at the vehicle, transitioning from presenting the instructions for performing the service to presenting a second set of driving instructions for navigating from the parking location to a second service address.

7. The computer-implemented method of claim 6, wherein the geolocation data is first geolocation data, the motion data is first motion data, the input is a first input, and the classification is a first classification, and wherein the method further comprises:

executing, based at least in part on a second input comprising second geolocation data and second motion data detected by the electronic device, the machine learning model to generate a second classification indicating a driving state; and determining that the service has been performed and the electronic device is located at the vehicle based at least in part on the second classification.

8. The computer-implemented method of claim 6, wherein the geolocation data is first geolocation data, the motion data is first motion data, and the threshold distance is a first threshold distance, and wherein the method further comprises, subsequent to presenting the instructions for performing the service:

detecting, based at least in part on second geolocation data and second motion data, that the electronic device is within a second threshold distance from the parking location or that the electronic device has a velocity exceeding a velocity threshold; and determining that the service has been performed and the electronic device is located at the vehicle based at least in part on detecting that the electronic device is within the second threshold distance or that the electronic device has the velocity exceeding the velocity threshold.

9. The computer-implemented method of claim 6, further comprising:

determining the parking location of the vehicle based at least in part on:

identifying the location of the vehicle by identifying a location of the electronic device at the activity transition.

10. The computer-implemented method of claim 9, wherein determining the parking location of the vehicle is further based at least in part on detecting a location at which the electronic device loses or regains a Bluetooth connection to the vehicle.

11. The computer-implemented method of claim 9, wherein determining the parking location of the vehicle further comprises:

determining, based at least in part on the geolocation data or the motion data, a parking side of the road of the vehicle at the activity transition.

12. The computer-implemented method of claim 5, further comprising executing the machine learning model to generate the classification responsive to detecting a change in geolocation data detected by the electronic device.

13. The computer-implemented method of claim 5, wherein the input comprises the geolocation data detected within a predefined time window and the motion data detected within the predefined time window, and wherein the machine learning model is configured to generate the classification for an end time of the predefined time window.

14. The computer-implemented method of claim 5, wherein the geolocation data is first geolocation data, the motion data is first motion data, the input is a first input, and the classification is a first classification, and wherein the method further comprises:

determining that additional geolocation data has not been detected by the electronic device for more than a threshold amount of time; and responsive to determining that geolocation data has not been detected by the electronic device for more than the threshold amount of time, executing the machine learning model to generate a second classification based on a second input of second motion data.

15. The computer-implemented method of claim 5, wherein the motion data comprises accelerometer data and gyroscope data detected by an inertial measurement unit of the electronic device.

16. The computer-implemented method of claim 15, wherein the machine learning model is a neural network comprising a first temporal convolutional network (TCN) configured to receive the accelerometer data and the gyroscope data as input, and wherein the machine learning model further comprises a second TCN configured to receive the geolocational data as input, and wherein the classification is based at least in part on a first output generated by the first TCN and a second output generated by the second TCN.

17. One or more non-transitory computer-readable storage media comprising computer-executable instructions that, when executed by one or more processors of an electronic device, cause the electronic device to perform operations comprising:

executing, based at least in part on an input comprising geolocation data and motion data detected by the electronic device, a machine learning model to generate a classification indicating a state of the electronic device with respect to motion of a vehicle;

detecting, based at least in part on the geolocation data, that the electronic device is within a threshold distance from a service address;

detecting that the state is a non-driving state;

determining an activity transition from a driving state to the detected non-driving state of the vehicle; and responsive to (i) determining the activity transition to the detected non-driving state and (ii) detecting that the electronic device is within the threshold distance from the service address:

transitioning from presenting, on the electronic device, a set of driving instructions to presenting instructions for performing a service at the service address; and determining, based at least in part on the geolocation data or the motion data, a parking location of a vehicle, wherein the parking location includes an orientation comprising a direction that the vehicle was driving at the activity transition.

18. The one or more non-transitory computer-readable storage media of claim 17, wherein the service address is a first service address, and wherein the operations further comprise, subsequent to presenting the instructions for performing the service:

determining that the service has been performed and the electronic device is positioned at a vehicle; and responsive to determining that the service has been performed and the electronic device is positioned at the vehicle, transitioning from presenting the instructions for performing the service to presenting a second set of driving instructions to a second service address.

19. The one or more non-transitory computer-readable storage media of claim 18, wherein the geolocation data is first geolocation data, the motion data is first motion data, the input is a first input, and the classification is a first classification, and wherein the operations further comprise:

executing, based at least in part on a second input comprising second geolocation data and second motion data detected by the electronic device, the machine learning model to generate a second classification indicating a driving state; and determining that the service has been performed and the electronic device is located at the vehicle based at least in part on the second classification.

20. The one or more non-transitory computer-readable storage media of claim 17, wherein the operations further comprise executing the machine learning model to generate the classification responsive to detecting a change in geolocation data detected by the electronic device.

* * * * *